United States Patent
Akgun et al.

(10) Patent No.: US 12,325,331 B2
(45) Date of Patent: Jun. 10, 2025

(54) BRAKE SYSTEM

(71) Applicant: TUSAS-TURK HAVACILIK VE UZAY SANAYII ANONIM SIRKETI, Ankara (AR)

(72) Inventors: Burak Akgun, Ankara (AR); Halil Ceyhan, Ankara (AR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 80 days.

(21) Appl. No.: 18/565,651

(22) PCT Filed: Jun. 1, 2022

(86) PCT No.: PCT/TR2022/050515
§ 371 (c)(1),
(2) Date: Nov. 30, 2023

(87) PCT Pub. No.: WO2022/255982
PCT Pub. Date: Dec. 8, 2022

(65) Prior Publication Data
US 2024/0253470 A1    Aug. 1, 2024

(30) Foreign Application Priority Data
Jun. 4, 2021 (TR) .......................... TR2021/009213

(51) Int. Cl.
*B60L 7/26* (2006.01)
*B60L 7/18* (2006.01)
(Continued)

(52) U.S. Cl.
CPC ...... *B60L 7/26* (2013.01); *B60L 7/18* (2013.01); *B60L 15/2009* (2013.01);
(Continued)

(58) Field of Classification Search
None
See application file for complete search history.

(56) References Cited

U.S. PATENT DOCUMENTS

| | | |
|---|---|---|
| 6,199,670 B1 | 3/2001 | Shirai et al. |
| 6,929,102 B1* | 8/2005 | Schumacher ......... B60T 13/741 188/196 R |

(Continued)

FOREIGN PATENT DOCUMENTS

| | | | |
|---|---|---|---|
| CN | 101037108 A * | 9/2007 | ............ B60T 13/142 |
| CN | 105934379 A * | 9/2016 | ............ B60T 13/746 |

(Continued)

OTHER PUBLICATIONS

International Search Report and Written Opinion for PCT application No. PCT/TR2022/050515, mailed Sep. 23, 2022.
(Continued)

*Primary Examiner* — Kevin R Steckbauer
(74) *Attorney, Agent, or Firm* — Notaro, Michalos & Zaccaria P.C.

(57) ABSTRACT

A brake system for an air vehicle having more than one wheel is described. The system has at least one rotating structure provided on the aircraft o as to be concentric with the wheel and to perform rotational movement together with the wheel, a friction element, contacting and compressing the rotating structure so as to generate a brake force to slow down the air vehicle, at least one actuator triggered by an electric motor to actuate the friction element so that it moves closer to and/or away from the rotating structure, a control unit enabling to control the amount of current given to the electric motor, more than one brake level changing in dependence to the amount of current given to the electric motor and expressing the magnitude of brake force applied (Continued)

to the air vehicle, through which the rotating structure and friction element contact each other.

14 Claims, 6 Drawing Sheets

(51) Int. Cl.
  B60L 15/20 (2006.01)
  B60T 8/17 (2006.01)
  B60T 8/32 (2006.01)
  B60T 13/74 (2006.01)
  F16D 121/24 (2012.01)

(52) U.S. Cl.
  CPC ............ B60T 8/1703 (2013.01); B60T 8/325 (2013.01); B60T 13/741 (2013.01); *B60L 2200/10* (2013.01); *B60L 2240/429* (2013.01); *F16D 2121/24* (2013.01)

(56) References Cited

U.S. PATENT DOCUMENTS

| | | | | |
|---|---|---|---|---|
| 7,108,107 | B2* | 9/2006 | Ralea | F16D 66/02 188/1.11 L |
| 7,983,828 | B2* | 7/2011 | Ezoe | B60T 13/662 477/4 |
| 8,230,983 | B2* | 7/2012 | Bailey | F16D 66/02 188/1.11 E |
| 9,169,007 | B2* | 10/2015 | Mudry | B60T 7/085 |
| 9,457,782 | B2* | 10/2016 | Yao | B60T 7/22 |
| 9,738,378 | B1 | 8/2017 | Nikolic et al. | |
| 10,422,396 | B2* | 9/2019 | Yao | B60T 1/065 |
| 10,493,963 | B2* | 12/2019 | Arsenault | F16D 66/00 |
| 10,899,327 | B2* | 1/2021 | Nishikawa | B60T 8/171 |
| 11,518,353 | B2* | 12/2022 | Smith | B60T 8/171 |
| 11,623,620 | B2* | 4/2023 | Putz | B60T 8/17 188/71.8 |
| 2006/0219491 | A1* | 10/2006 | Ether | B60T 8/1703 188/71.5 |
| 2007/0246310 | A1* | 10/2007 | Baumgartner | F16D 65/567 188/71.7 |
| 2011/0226569 | A1 | 9/2011 | Devlieg | |
| 2012/0006634 | A1 | 1/2012 | Bensch et al. | |
| 2012/0168264 | A1* | 7/2012 | Putz | F16D 65/18 188/72.1 |
| 2014/0027212 | A1* | 1/2014 | Nishida | B60T 17/22 188/17 |
| 2014/0156160 | A1* | 6/2014 | DeVlieg | B60T 8/00 701/70 |
| 2015/0260246 | A1* | 9/2015 | Yao | B60T 13/74 188/196 R |
| 2016/0032995 | A1* | 2/2016 | Nishino | F16D 65/18 188/72.3 |
| 2016/0076609 | A1* | 3/2016 | Narula | F16D 55/226 188/73.33 |
| 2017/0001610 | A1* | 1/2017 | Singh | B60T 13/741 |
| 2017/0350462 | A1* | 12/2017 | Yao | F16D 65/66 |
| 2018/0017118 | A1* | 1/2018 | Stoeger | F16D 66/026 |
| 2018/0079402 | A1* | 3/2018 | Brüggemann | B64C 25/426 |
| 2018/0194333 | A1* | 7/2018 | Nishikawa | B60T 8/32 |
| 2019/0263511 | A1* | 8/2019 | Plude | B64C 25/42 |
| 2019/0322253 | A1* | 10/2019 | Arsenault | B64C 25/44 |
| 2020/0002126 | A1* | 1/2020 | Saarelainen | B66B 5/0031 |
| 2020/0269824 | A1* | 8/2020 | Witte | B60T 1/065 |
| 2021/0394725 | A1* | 12/2021 | Smith | B64C 25/46 |
| 2022/0073045 | A1* | 3/2022 | Nishiwaki | B60T 8/172 |
| 2022/0274577 | A1* | 9/2022 | Pilzweger | B60L 7/24 |
| 2022/0297661 | A1* | 9/2022 | Kircher | B60T 7/045 |
| 2024/0253470 | A1* | 8/2024 | Akgun | B60T 8/325 |

FOREIGN PATENT DOCUMENTS

| | | | | |
|---|---|---|---|---|
| CN | 105934379 | B * | 9/2018 | ............ B60T 13/746 |
| CN | 115515830 | A * | 12/2022 | ............ B60T 13/741 |
| CN | 117440910 | A * | 1/2024 | .......... B60L 15/2009 |
| DE | 60130390 | T2 * | 6/2008 | ............ B60T 13/741 |
| DE | 102015214346 | A1 * | 2/2016 | ............ B60T 1/06 |
| EP | 3092159 | A1 * | 11/2016 | ............ B60T 13/746 |
| EP | 3092159 | B1 * | 8/2017 | ............ B60T 13/746 |
| EP | 3348443 | A1 * | 7/2018 | .............. B60T 13/74 |
| EP | 3326877 | B1 * | 6/2019 | ............ B60T 13/662 |
| EP | 3348443 | B1 * | 10/2021 | ............ B60T 13/74 |
| FR | 2954742 | A1 * | 7/2011 | ............ B60T 13/741 |
| FR | 3144086 | A1 * | 6/2024 | |
| JP | 2003083373 | A | 3/2003 | |
| JP | 6987197 | B1 * | 12/2021 | .............. B60T 13/74 |
| TR | 2021009213 | A2 * | 12/2022 | .......... B60L 15/2009 |
| TR | 2021021743 | A2 * | 7/2023 | ............ B60T 13/745 |
| WO | WO-2014015473 | A1 * | 1/2014 | ............ B64C 25/42 |
| WO | WO-2015106160 | A1 * | 7/2015 | ............ B60T 13/746 |
| WO | WO-2021180794 | A1 * | 9/2021 | ............ B60T 13/741 |
| WO | WO-2022255982 | A1 * | 12/2022 | .......... B60L 15/2009 |
| WO | WO-2023129014 | A1 * | 7/2023 | ............ B60T 13/745 |
| WO | WO-2024132274 | A1 * | 6/2024 | |
| WO | WO-2024218317 | A1 * | 10/2024 | ............ B60T 8/1703 |

OTHER PUBLICATIONS

International Preliminary Report on Patentability, completed on Jul. 10, 2023.
Demand/Request for Preliminary Examination dated Mar. 24, 2023.
Written Opinion of the International Preliminary Examining Authority dated Apr. 26, 2023, and response dated Jun. 19, 2023.
Applicant Mar. 24, 2023 Response to the Written Opinion of the International Preliminary Examining Authority.
International Application Status Report—generated Nov. 9, 2023.

* cited by examiner

BRAKE SYSTEM

FIELD

This invention relates to electromechanical brake systems in air and/or space vehicles.

BACKGROUND

Brake systems in air and/or space vehicles are the basic systems that enable to control the speed and maneuver of an air vehicle during its movement on a runway. In the prior art, hydraulic brakes are generally used in air vehicles, wherein the brake force is transferred to hydraulic brake calipers in wheels by master cylinders. However, in recent times, fully electric brake systems have been preferred in air vehicles, especially in unmanned aerial vehicles, as they are more practical and require less maintenance.

In electric brake systems, such methods are used as generating braking torque by electromagnetic force, generating compressive force by introducing transmission by a gear/screw shaft mechanism placed in front of the electric motor and determining the braking dosage by measuring this compressive force, or applying brake by controlling the brake pressure piston's position. Force control measurement requires a solution that will not be affected by temperature variations in the air vehicle and causes problems, such as failure to obtain a desired compressive force with positional variation as the pads wears out in electric brakes, which are designed according to positional control. There are studies for developing methods to solve such problems.

The United States patent document U.S. Pat. No. 6,199,670, which is included in the known state of the art, discloses a brake system enabling an air vehicle to slow down and stop and being operated by means of an actuator which takes the necessary power from the respective engine. In that system, it is mentioned that the engine current is increased and decreased to obtain the necessary brake force and that a control system is used for controlling the current level.

The United States patent document U.S. Pat. No. 9,169,007B2, which is included in the known state of the art, discloses a method of managing parking braking in a braking system for a vehicle fitted with electric brakes. The method comprises the steps of: selecting a first direct adjustment table and applying it for a predetermined initial application time; making a first adjustment; comparing a real change in position of the pusher with a theoretical change in position of the pusher obtained from the direct adjustment tables after an application time equal to the initial application time; and selecting a second direct adjustment table for which the theoretical change in position of the pusher is the closest to the real change in position.

The other patent document EP3092159A1, which is included in the known state of the art, discloses a method and system for increasing accuracy of clamping force of electric aircraft carbon brakes providing greater accuracy for low brake clamping force commands by dedicating a portion of a plurality of electric brake actuators of each brake to low brake clamping force commands, without otherwise affecting normal braking. The system is meter aircraft brakes to alleviate structural loading of an aircraft by limiting initial application of braking force and delaying a full onset of braking for a preset period of time.

Another patent document U.S. Pat. No. 6,929,102B1, which is included in the known state of the art, discloses a method for actuating a wheel brake assembly. The method of the invention has the advantage that the braking force of the wheel brake assembly can be increased beyond the value that it has in the quasi-static terminal state, and the braking action is improved substantially.

SUMMARY

A brake system developed by this invention enables the process of slowing down and stopping an air vehicle to be carried out in a more practical and reliable manner.

Another object of the present invention is to accomplish the process of slowing down an air and/or space vehicle, in which brake systems are used that are triggered by the vehicle's electric motor, by means of a more efficient system.

A further object of this invention is to accomplish a brake system that performs the control of brake systems in unmanned aerial vehicles in a safer and faster manner.

An air vehicle in the form of an aircraft and/or an unmanned aerial vehicle, realized to achieve the object of the invention and defined in the first claim and in the claims dependent thereon, comprises more than one wheel, controlled by a pilot or provided on an autonomously operable air vehicle under the control thereof, situated where the air vehicle makes contact with the ground, i.e. a runaway, and enables the air vehicle to move and change direction on the ground; a disc-shaped rotating structure, having substantially the same form with the wheel, disposed on the air vehicle in alignment and in connection with the wheel and rotatable in correlation with the wheel; and a friction element, disposed in the brake system on the opposite sides of the rotating structure in contact with the rotating structure, squeezing the rotating structure and exerting a compressive force to prevent the rotation of the rotating structure, thus generating a brake force in the air vehicle and enabling the speed of the air vehicle to be reduced. Here, an actuator transmits the motion transmitted by the electric motor, enabling the friction element to be moved so as to increase or decrease the distance between the friction element and the rotating structure. The actuator enables the friction element to contact the rotating structure and interrupts this contact and moves the friction element away from the rotating structure. With an increase in the amount of current used by the electric motor, the braking force increases, and when the current drawn by the motor decreases, the braking force applied to the air vehicle is reduced. The amount of current needed by the electric motor to provide a manufacturer-predetermined braking is scaled into multiple levels, referred to as the brake level, according to the magnitude of brake force applied to the air vehicle, wherein when a threshold value required by a brake input supplied from an autonomous flight control system or a pilot is exceeded, the braking force applied to the air vehicle is controlled such that it is switched between these levels by means of a control unit. The brake levels refer to states in which the friction element and the rotating structure contact each other and the brake force applied by the brake system to the air vehicle is different from zero.

The brake system according to the invention can operate to increase or decrease the braking force in response to a user command and/or as a result of executing a code in the control unit to enable the air vehicle to slow down, stop and/or change direction. Here, it can be switched from one brake level to another brake level when the value of the input from the user and/or control unit exceeds a threshold value predetermined by the manufacturer. By reducing power losses caused by static friction etc. in the gearbox of the electric motor when switching between the brake levels, the contact of the rotating structure to the friction element is terminated for a short time to minimize the time delay between the time an increase in the current supplied to the motor takes place and the time an increase in the brake force applied to the vehicle occurs. For any brake level applied to the vehicle, there are provided parameters indicating the braking force predetermined by the manufacturer and the current drawn by the electric motor. When the contact between the rotating structure and the friction element is interrupted while it is switched from one brake level to another, the electric motor is brought to the current value required for the next brake force and prepared accordingly, and then the friction element is brought back into contact with the rotating structure for the new brake level. In this way, when the user-given input command to increase or decrease the braking force exceeds a certain threshold, the brake level is changed by the control system and this change can be observed as a change in the braking force applied to the air vehicle within a delay in an order of milliseconds. It is aimed here to prevent losses from the static friction of the electric motor gearbox and from the transmission elements by operating the electric motor in the opposite direction instantly.

In an embodiment of the invention for the brake system, when the brake assumes a free position (R), in which the brake system is positioned so as to leave a distance between the rotating structure and the friction element in case a brake level change takes place or the brake application ends, it actuates the friction element so as to increase the distance between the friction element and the rotating structure for a certain period of time only according to the time command, regardless of any distance. It removes the friction element from the rotating structure so that the period of time is different or equal to each other as the transitions between the different brake levels take place. The contact between the friction element and the rotating structure is restored when the value of a user predetermined electric motor current and brake force is reached. In this way, it is ensured that the magnitude of the brake force acting on the air vehicle is independent of size variations that may occur due to the wear of the friction element and/or the rotating structure. In addition, it can be ensured that the system works in harmony with rotating structures of varying thicknesses.

In an embodiment of the invention for the brake system, a control unit is provided that enables the friction element to be brought to a remote position (U), in which the distance between the friction element and the rotating structure is increased to gain its maximum value, once the contact of the wheels with the ground is lost as the air vehicle takes off from the runway or before the wheels contact the ground as the air vehicle lands on the runway at the end of its flight, thereby enabling almost the same force to be exerted to the wheels in the moment a brake command is given, thanks to the fact that the friction elements on the air vehicle are in correlated positions before the wheels contact the ground and the first braking process is carried out. Since each friction element will remain in its position from the previous take-off when all the brakes on the air vehicle are not brought to the remote position (U) before contact with the runway takes place, they may be at different positions such that in this case a problem may arise wherein different braking forces are applied to different rotating structures on the air vehicle in the first user- or control unit-given brake command.

In an embodiment of the invention, the brake system comprises a limiter on the actuator, which prevents the friction element from moving when the distance between the friction element and the rotating structure takes its maximum value as predetermined by the manufacturer. Thanks to the limiter, the maximum magnitude to be taken by the distance between the rotating structure and the friction element is limited. Thus, the friction element is enabled to move within a desired position range.

In an embodiment of the invention, the brake system comprises a first brake level and multiple second brake levels, making up the brake levels wherein the brake force applied to the wheels and the amount of current drawn by the electric motor are kept constant at the values predetermined by the manufacturer. When the friction element is triggered from the first brake level on a command sent by the user and/or control unit, the brake force and the corresponding current value are increased and it is brought to the second brake level, thereby increasing the value of the friction force applied by the friction element to the rotating structure, preventing the rotational movement of the rotating structure. When the opposite occurs, the brake force and the corresponding current value are reduced and it is switched from the second brake level to the first brake level.

In an embodiment of the invention for the brake system, the control unit prevents the contact between the rotating structure and the friction element during each brake level switching for equal periods of time as predetermined by the manufacturer. The period of time during which the contact of the rotating structure with the friction element is prevented as it is switched between the first brake level and the second brake level can be the same as the disengagement time when it is switched between the second brake level and another second brake level.

In an embodiment of the invention for the brake system, the control unit prevents the contact between the rotating structure and the friction element between each brake level for different periods of time as predetermined by the manufacturer. The period of time during which the contact of the rotating structure with the friction element is prevented as it is switched between the first brake level and the second brake level and the disengagement time when it is switched between the second brake level and another second brake level can take different values, thus ensuring that the system reaches manufacturer-predetermined current and brake force values.

In an embodiment of the invention, the brake system takes away the excess load on the electric motor by operating it in the opposite direction when it is switched between brake levels, and at the same time, the friction element is triggered by the actuator, which can be a piston, and is moved away from the rotating disc by performing a linear movement.

In an embodiment of the invention for the brake system, the control unit has a maintenance mode in which the friction element is moved away from the rotating structure and brought to the remote position (U) when commanded by the user and/or the control unit for providing convenience in performing air vehicle maintenance operations and parts replacement. A pilot and/or a person in charge can select the maintenance mode and/or driving mode.

In an embodiment of the invention, the brake system comprises an input unit that enables the user to select between brake levels and/or air vehicle modes. Thanks to the input unit, a command can be sent to the system to provide a slowing down as desired by the user.

In an embodiment of the invention, the brake system comprises a brake level indicator indicating various values and parameters to the user in relation to the brake level applied by the user and/or the control unit to the air vehicle.

In an embodiment of the invention for the brake system, the duration of the brake squeezing and releasing command that can be given consecutively by the user to the input unit is predetermined by the manufacturer. When repeated brake application and release commands are given in excess of a specified threshold value, the friction element is moved to the remote position (U). In this way, the system is protected against system crashes by means of the control unit and any accidents that may occur due to user errors are prevented.

In an embodiment of the invention for the brake system, the control unit actuates the friction element for a duration that is less than a second in a direction that increases the distance between the friction element and the rotating structure so that the friction element is moved away from the rotating structure when the brake level is changed. By keeping this duration short, the delay to occur between when the contact between the friction element and the rotating structure is interrupted and when a new contact is made is prevented from effecting the system behavior.

In an embodiment of the invention for the brake system, the control unit has an autonomous mode in which air vehicle control commands are given by the control unit, and a manual mode that enables the air vehicle to be controlled by a pilot. By switching between autonomous and manual modes by the pilot and/or the user, the way of controlling the air vehicle and the brake system can be changed. In manual mode, the brake commands are given by the pilot controlling the air vehicle, whereas in autonomous mode these commands are executed by running a code in the control unit.

In an embodiment of the invention for the brake system, the control unit automatically applies brake force and/or warns the user by means of the brake level indicator if the user has not given a brake level change command during the taxi operation while landing in manual mode. When the air vehicle is used in manual mode, it is expected that the relevant command is given by the user in order to apply the necessary brake force when the wheels contact the ground. If no command is given within a manufacturer-predetermined period of time, the brake system will automatically provide braking.

The brake system realized to achieve the object of the present invention is shown in the attached figures, wherein from these figures;

Figure 1:
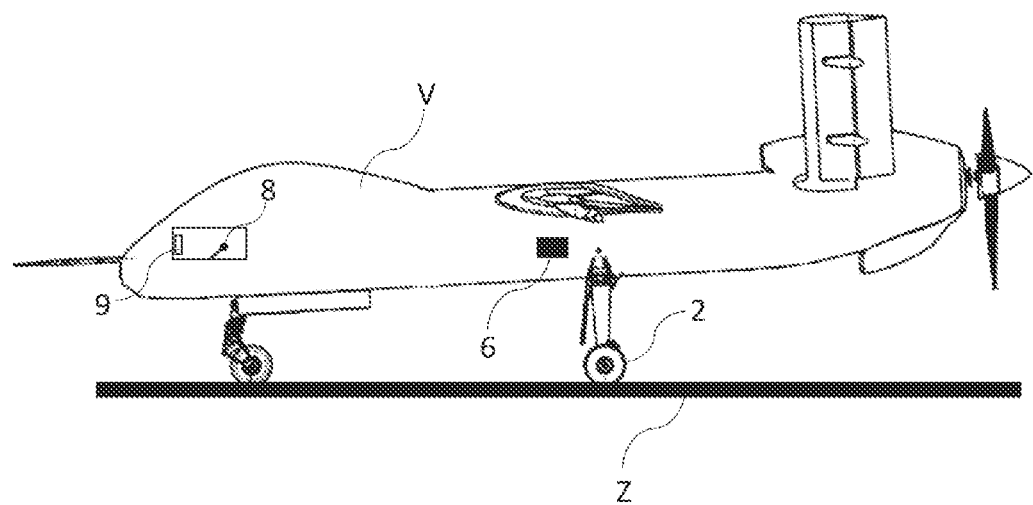
FIG. 1 is a schematic view of the air vehicle and of a brake system.

The parts illustrated in figures are individually assigned a reference numeral and the corresponding terms of these numbers are listed below.
1. Brake system
2. Wheel
3. Rotating structure
4. Friction element
5. Actuator
6. Control unit
7. Brake levels
   701. First brake level
   702, 703. Second brake level
8. Input unit
9. Brake level indicator
10. Limiter
(E) Electric motor
(V) Air vehicle
(Z) Ground
(U) Remote position
(R) Free position

DETAILED DESCRIPTION

The brake system (1) configured for an air vehicle (V), comprises more than one wheel (2) enabling the air vehicle (V) to move on a ground (Z), at least one rotating structure (3) provided on the air vehicle (V) so as to be concentric with the wheel (2), and to perform rotational movement together with the wheel (2), a friction element (4), contacting and compressing the rotating structure (3) so as to generate a brake force to slow down the air vehicle (V), at least one actuator (5) triggered by an electric motor (E) to actuate the friction element (4) so that it moves closer to and/or away from the rotating structure (3), a control unit (6) enabling to control the amount of current given to the electric motor (E), more than one brake level (7) changing in dependence to the amount of current given to the electric motor (E) and expressing the magnitude of brake force applied to the air vehicle (V), through which the rotating structure (3) and friction element (4) contact each other (FIG. 1).

Figure 2:
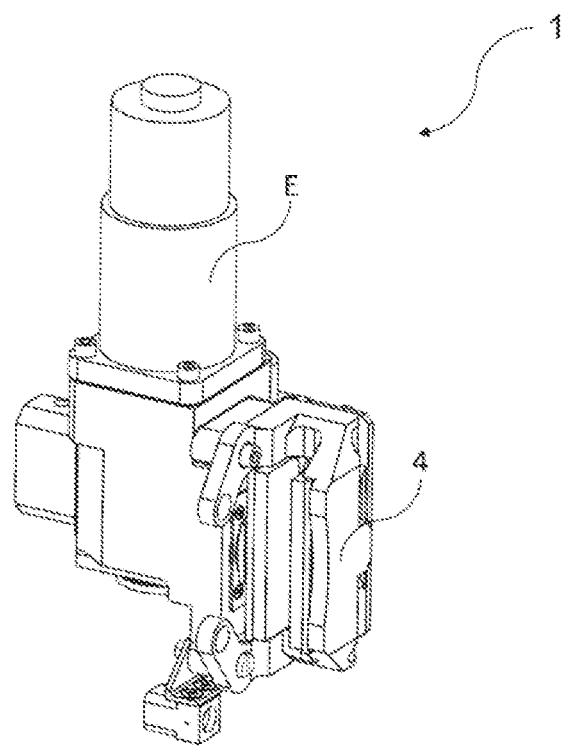
FIG. 2 is a perspective view of a brake system.
Figure 3:
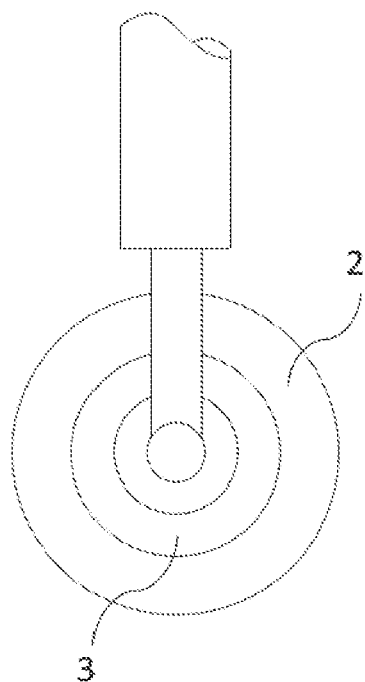
FIG. 3 is a schematic view of a rotating structure and wheels.
Figure 4:
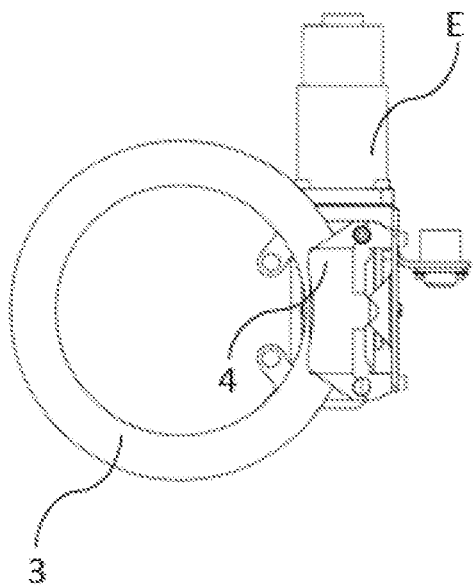
FIG. 4 is a side view of the rotating structure friction element and electric motor.
Figure 5:
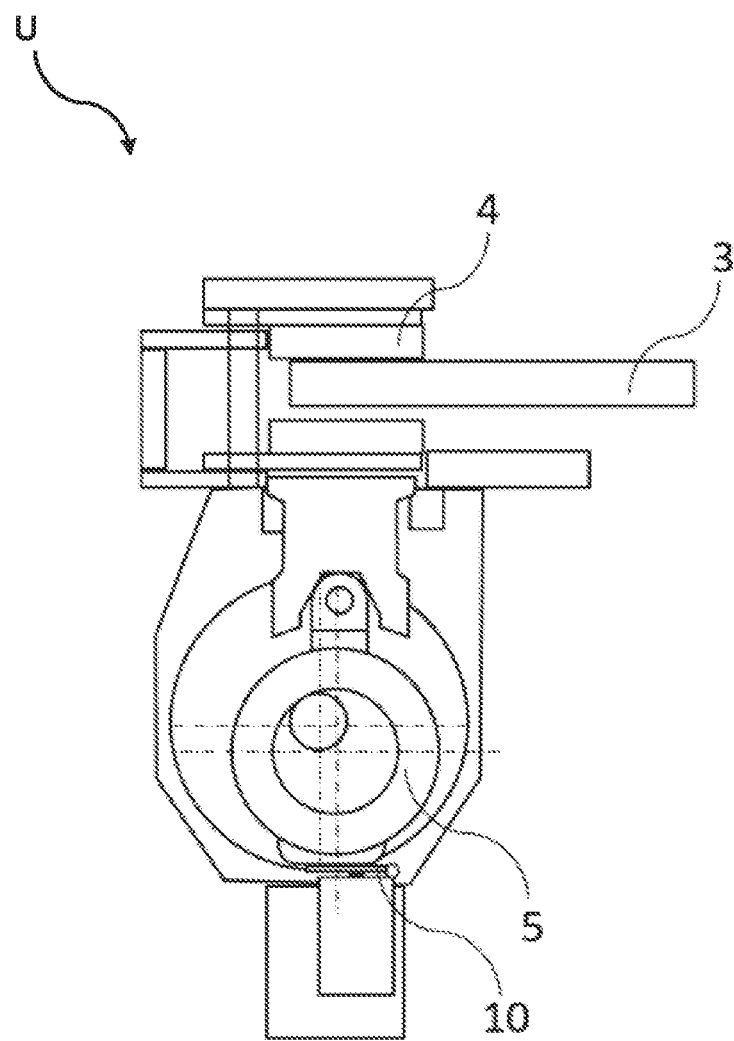
FIG. 5 is a cross-sectional view of a brake system in the remote position (U).
Figure 6:
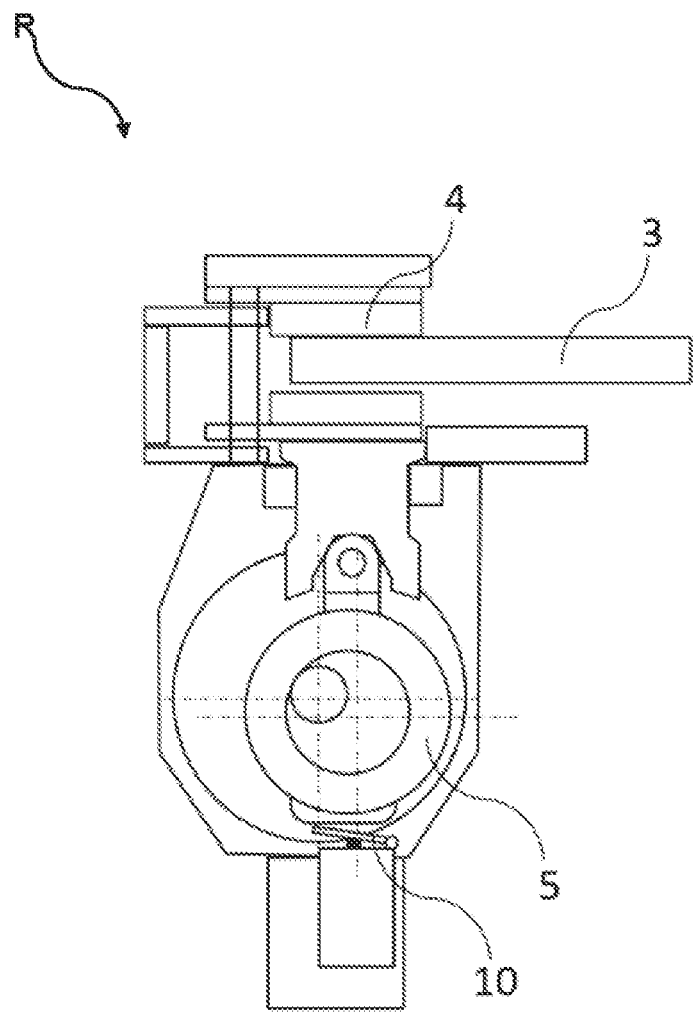
FIG. 6 is a cross-sectional view of a brake system in the free position (R).
Figure 7:
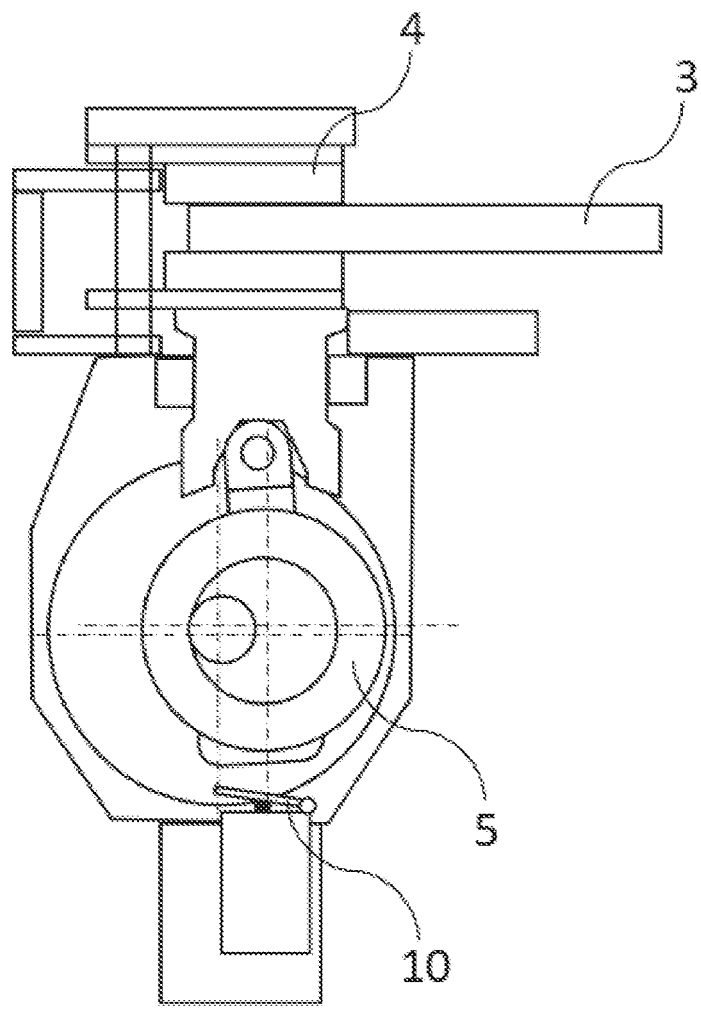
FIG. 7 is a cross-sectional top view of a brake system when it applies brake force to the air vehicle.
Figure 8:
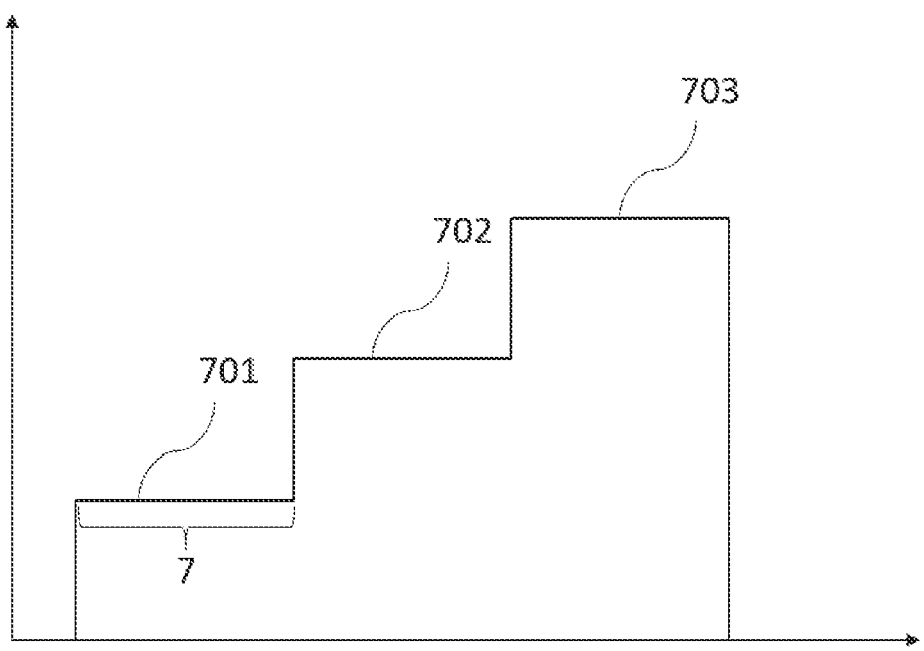
FIG. 8 is a graphical view of the brake levels expressing the change of brake force applied to the air vehicle over time.

The control unit (6) of the brake system (1) according to the invention prevents the contact between the rotating structure (3) and the friction element (4) for a period of time as predetermined by the manufacturer when it is switched between brake levels (7) on a brake command given by the user and/or control unit (6), thereby enabling to reduce looses due to power transmission elements and thus enabling predetermined brake forces to be applied to the wheels (2) (FIG. 2).

The air vehicle (V) performs its movement on the ground (Z) by means of wheels (2) and the brake system (1) is used to enable the air vehicle (V) to slow down and/or stop. The rotating structure (3) is detachably mounted to a recess by means of fasteners, said recess being provided in an interior of the wheels (2) on the air vehicle (V) and being form-fitting to the rotating structure (3). The friction element (4) is located on the brake system (1) so as to be opposed to the surfaces forming the thickness of the rotating structure (3) and is able to compress the rotating structure (3) by contacting these surfaces. While one side of the friction element (4) is held constant, the other side thereof is brought closer to the rotating structure (3), or it is brought closer to the rotating structure (3) from both sides, to perform braking. The actuation of the friction element (4) is enabled by an electric motor (E), an actuator (5) in the form of a piston, and transmission elements provided in between. The magnitude of the brake force to be applied to the air vehicle (V) is scaled into so-called brake levels (7) each having a predetermined force magnitude, wherein the determination of the brake level (7) corresponding to an input given by the user and/or the control unit (6) is carried out by the control unit (6). The control unit (6) enables the electric motor (E) to draw the current in an amount that is sufficient for the respective brake level (7).

In order to perform the braking process, it is required that the rotating structure (3) and the friction element (4) contact each other. The compressive force to be applied by the friction element (4) to the rotating structure (3) increases or decreases in direct proportion to the amount of current drawn by the electric motor (E). When switching between brake levels (7) each having brake force and current amount parameters predetermined by the manufacturer, the contact between the friction element (4) and the rotating structure (3) is instantly interrupted. In this way, the problem is almost completely eliminated in that the desired brake force is applied to the air vehicle (V) in a delayed manner due to power losses caused by the static friction in the electric motor's (E) gearbox when it is switched between brake levels (7).

In an embodiment of the invention, the brake system (1) comprises an actuator (5) that increases the distance between the friction element (4) and the rotating structure (3) according to a manufacturer-predetermined time command it receives from the control unit (6), and moves the friction element (4) only in a time-dependent manner so as to move the friction element away from the rotating structure (3) when the brake is brought to a released position (R), in which the rotating structure (3) does not contact the friction element (4), thereby enabling the generated brake force to be not varied in dependence to the wearing out level of the friction element (4) and/or the rotating structure (3) and/or in dependence to the thickness of the friction element (4). The actuator (5) provides the energy required for the actuation from the electric motor (E) and ensures that the movement transmitted by the electric motor (E) is delivered to the friction element (4). The removal of the friction element (4) from the rotating structure (3) is changed only according to the time determined by the manufacturer instead of any position data, and the friction element (4) is moved for a certain period of time and then its contact with the rotating structure (3) is terminated. At the end of a certain period of time, after the brake level (7) is changed the friction element (4) is made to contact the rotating structure (3) and brake is applied to the air vehicle (V).

In an embodiment of the invention for the brake system (1), the control unit (6) enables the friction element (4) to be brought to a remote position (U), in which the distance between the friction element (4) and the rotating structure (3) is maximum, once the contact of the wheel (2) with the ground (Z) is lost during take off, or just before the wheel (2) contacts the ground (Z) during landing, thereby enabling almost the same force to be applied to the wheels (2) with the friction elements (4) on the air vehicle (V) assuming the same position before braking. In cases where no brake force is applied on the air vehicle (V), the friction element (4) is retracted and brought to a remote position (U) where it is stopped by a limiter (10). In this way, it is ensured that a user-preferred brake level (7) can be applied on all wheels (2) during landing. When the air vehicle (V) lands on the ground (Z), the friction elements (4) are moved towards the rotating structure (3) to apply a braking force. When the friction element (4) contacts the rotating structure (3) the electric motor (E) starts to draw current and switching is enabled between the brake levels (7) by changing the current value.

In an embodiment of the invention, the brake system (1) comprises a limiter (10) provided on the actuator (5) to terminate the movement of the friction element (4) when the distance between the friction element (4) and the rotating structure (3) takes a maximum value determined by the user. The limiter (10) is provided on the brake system (1) so as to limit the movement of the actuator (5). With the limiter (10), the actuator (5) in the form of a piston is prevented from moving beyond a certain level and from reaching unwanted positions that may damage the system.

In an embodiment of the invention, the brake system (1) comprises a first brake level (701) in which the brake force applied to the wheels (2) and the current used by the electric motor (E) are kept constant at a predetermined level, and more than one second brake level (702, 703) in which the friction element (4) is brought from the first brake level (701) by increasing the brake force and the corresponding current value when a constant command is given by the user and/or the control unit (6). When switching from the first brake level (701) to the second brake level (702), the electric motor's (E) current value and the brake force value are increased. When it is desired to reduce the brake force applied to the air vehicle (V), the brake force and the corresponding current value are reduced so that it is switched from the second brake level (702) to the first brake level (701).

In an embodiment of the invention for the brake system (1), the control unit (6) prevents the contact between the rotating structure (3) and the friction element (4) between each brake level (7) for identical periods of time as predetermined by the manufacturer. When it is switched from one brake level (7) to another brake level (7), the time frame during which the contact between the friction element (4) and the rotating structure (3) is interrupted may be identical in other switching events to take place between different brake levels (7).

In an embodiment of the invention for the brake system (1), the control unit (6) prevents the contact between the rotating structure (3) and the friction element (4) between each brake level (7) for different periods of time as predetermined by the manufacturer. When it is switched from one brake level (7) to another brake level (7), the time frame during which the contact between the friction element (4) and the rotating structure (3) is interrupted may be determined to be different in other switching events to take place between different brake levels (7). Once the electric motor's (E) current amount and the brake force applied to the air vehicle (V) take the desired values, the contact between the friction element (4) and the rotating structure (3) can be restored and the brake force application can be resumed.

In an embodiment of the invention, when the brake level (7) is changed the brake system (1) operates the electric motor (E) in the opposite direction for a predetermined period of time and the actuator (5) moves the friction element (4) in the direction in which it extends so as to increase the distance between the friction element (4) and the rotating structure (3). The friction element (4) is triggered by the electric motor (E) and the actuator (5) to move linearly away from the rotating structure (3) and the contact between the friction element (4) and the rotating structure (3) is prevented for a predetermined period of time.

In an embodiment of the invention for the brake system (1), the control unit (6) has a maintenance mode in which the friction element (4) is brought to the remote position (U) for ease of access when commanded by the user and/or the control unit (6) during air vehicle (V) maintenance operations and parts replacement. In the air vehicle (V) which is put into maintenance mode by the control unit (6), providing an easy access to the brake system (1) for the maintenance personnel facilitates parts maintenance and repair operations. When the air vehicle (V) is put into maintenance mode, the friction element (4) is brought to a remote position (U) away from the rotating structure (3).

In an embodiment of the invention, the brake system (1) comprises at least one input unit (8) enabling the user to select a brake level (7). The user can determine the amount of brake force to be applied to the air vehicle (V) by means of the input unit (8). The control unit (6) enables to supply the electric motor (E) the amount of current required by the respective brake level (7).

In an embodiment of the invention, the brake system (1) comprises multiple brake level indicators (9) indicating to the user the applied brake level (7). With the brake level indicator (9), the user is informed instantly about the brake level (7) which refers to the braking force that varies in dependence to the current value drawn by the electric motor (E).

In an embodiment of the invention for the brake system (1), the control unit (6) protects the system against freeze-ups by enabling the friction element (4) to be brought to the remote position (U) when repeated brake application and release commands in excess of a specified threshold value are given by the user to the input unit (8). When successive brake application and subsequent brake release actions take place in excess of a user-determined frequency, the friction element (4) must be constantly moved away from the rotating structure (3), which may cause the system to fail and malfunction. By virtue of the control unit (6), the system is protected against possible errors and damages by moving the friction element (4) to the remote position (U) when repeated squeeze-release commands are encountered.

In an embodiment of the invention for the brake system (1), the control unit (6) moves the friction element (4) for a period of time less than a second so as to move it away from the rotating structure (3) when the brake level (7) is changed. By means of the control unit (6), the friction element (4) is moved away from the rotating structure (3) for a short period of time such that the static friction in the electric motor (E) and power losses caused by the transmission elements are reduced. By keeping the period of time during which the contact between the friction element (4) and the rotating structure (3) is prevented in milliseconds, it is at least partially prevented that a variation in the brake force causes a negative effect on the air vehicle (V).

In an embodiment of the invention for the brake system (1), the control unit (6) has an autonomous mode in which the air vehicle (V) control commands are given by the control unit (6), and a manual mode that allows the air vehicle (V) to be controlled by the pilot. In order for the air vehicle (V) to move autonomously, it is possible to switch to the automatic pilot via the control unit (6), and when the operator wants to command the air vehicle (V), it can be switched to the manual mode by means of the control unit (6).

In an embodiment of the invention for the brake system (1), the control unit (6) automatically applies brake force and/or warns the user through the brake level indicator (9) if the user has not given a brake level (7) change command while a taxi operation is being carried out following landing in manual mode. In order for the air vehicle (V) to move safely on the ground (Z), the brake level (7) must be entered by the user. When there is no brake level (7) entered by the user, a corresponding brake force value will be applied by the control unit (6) to brake the air vehicle (V) and/or the user is informed by the brake level indicator (9) under the command of the control unit (6) about the brake level (7) that depends on the amount of force that is applied.

The invention claimed is:

1. A brake system (1) configured for an air vehicle (V) having a plurality of wheels (2) enabling the air vehicle (V) to move on a ground (Z), comprising:
    at least one rotating structure (3) provided on the air vehicle (V) so as to be concentric with the wheel (2) and to perform rotational movement together with the wheel (2);
    a friction element (4) contacting and compressing the rotating structure (3) so as to generate a brake force to slow down the air vehicle (V);
    an actuator (5) triggered by an electric motor (E) to actuate the friction element (4) so that it moves closer to and/or away from the rotating structure (3);
    a control unit (6) enabling to control an amount of current supplied to an electric motor (E), more than one brake level (7) changing in dependence to the amount of current supplied to the electric motor (E) and expressing a magnitude of the brake force applied to the air vehicle (V), according to which the rotating structure (3) and friction element (4) contact each other;
    wherein the control unit (6) is configured to prevent the contact between the rotating structure (3) and the friction element (4) for a period of time as predetermined by a manufacturer when it is switched between brake levels (7) on a brake command given by a user and/or the control unit (6), thereby enabling to reduce losses due to power transmission elements and thus enabling predetermined brake forces to be applied to the wheels (2); and
    wherein the actuator (5) increases a distance between the friction element (4) and the rotating structure (3) according to a manufacturer-predetermined time command it receives from the control unit (6), moves the friction element (4) only in a time-dependent manner so as to move the friction element (4) away from the rotating structure (3) and bring the friction element (4) closer to the rotating structure (3) in equal time, so as to move the friction element (4) away from the rotating structure (3) when the brake system is brought to a released position (R), in which the rotating structure (3) does not contact the friction element (4), thereby enabling the generated brake force to be not varied in dependence to a wearing out level of the friction element (4) and/or the rotating structure (3) and/or in dependence to a thickness of the friction element (4).

2. The brake system (1) according to claim 1, wherein the control unit (6) is configured to enable the friction element (4) to be brought to a remote position (U), in which the distance between the friction element (4) and the rotating structure (3) is maximum once contact of at least one of the plurality of wheels (2) with the ground (Z) is lost during takeoff, or just before at least one of the plurality of wheels (2) contacts the ground (Z) during landing, thereby enabling almost an identical force to be applied to the plurality of wheels (2) with the friction element (4) on the air vehicle (V) taking the same position before braking.

3. The brake system (1) according to claim 1, comprising a limiter (10) provided on the actuator (5) to terminate movement of the friction element (4) when the distance between the friction element (4) and the rotating structure (3) takes a maximum value as determined by the user.

4. The brake system (1) according to claim 1, comprising a first brake level (701) in which the brake force applied to the plurality of wheels (2) and the current used by the electric motor (E) are kept constant at a predetermined level, and more than one second brake level (702, 703) in which the friction element (4) is brought from the first brake level (701) by increasing the brake force and the corresponding current value when a constant command is given by the user and/or the control unit (6).

5. The brake system (1) according to claim 1, wherein the control unit (6) configured to prevent contact between the rotating structure (3) and the friction element (4) between each brake level (7) for identical periods of time as predetermined by the manufacturer.

6. The brake system (1) according to claim 1, wherein the control unit (6) configured to prevent contact between the rotating structure (3) and the friction element (4) between each brake level (7) for different periods of time as predetermined by the manufacturer.

7. The brake system (1) according to claim 1, wherein when the brake level (7) is changed the electric motor (E) is operated in the opposite direction for a predetermined period of time and the actuator (5) moves the friction element (4) in the direction in which it extends so as to increase the distance between the friction element (4) and the rotating structure (3).

8. The brake system (1) according to claim 1, wherein the control unit (6) has a maintenance mode in which the friction element (4) is brought to a remote position (U) for ease of access when commanded by the user and/or the control unit (6) during air vehicle (V) maintenance operations and parts replacement.

9. The brake system (1) according to claim 1, comprising at least one input unit (8) enabling the user to determine a brake level (7).

10. The brake system (1) according to claim 1, characterized by multiple brake level indicators (9) indicating to the user an applied brake level (7).

11. The brake system (1) according to claim 9, wherein the control unit (6) configured to protect the system against freeze-ups by enabling the friction element (4) to be brought to a remote position (U) when repeated brake application and release commands in excess of a specified threshold value are given by the user to the input unit (8).

12. The brake system (1) according to claim 1, wherein the control unit (6) configured to move the friction element (4) for a period of time less than a second so as to move it away from the rotating structure (3) when the brake level (7) is changed.

13. The brake system (1) according to claim 1, wherein the control unit (6) has an autonomous mode in which air vehicle (V) control commands are given by the control unit (6), and a manual mode that allows the air vehicle (V) to be controlled by a pilot.

14. The brake system (1) according to claim 10, wherein the control unit (6) configured to automatically apply brake force and/or warns the user through one or more of the brake level indicators (9) if the user has not given a brake level (7) change command while a taxi operation is being carried out following landing in manual mode.

* * * * *